March 3, 1931. D. E. HENNESSY 1,795,026
ELEVATING TRUCK HAVING AN OPEN END
Filed June 12, 1929
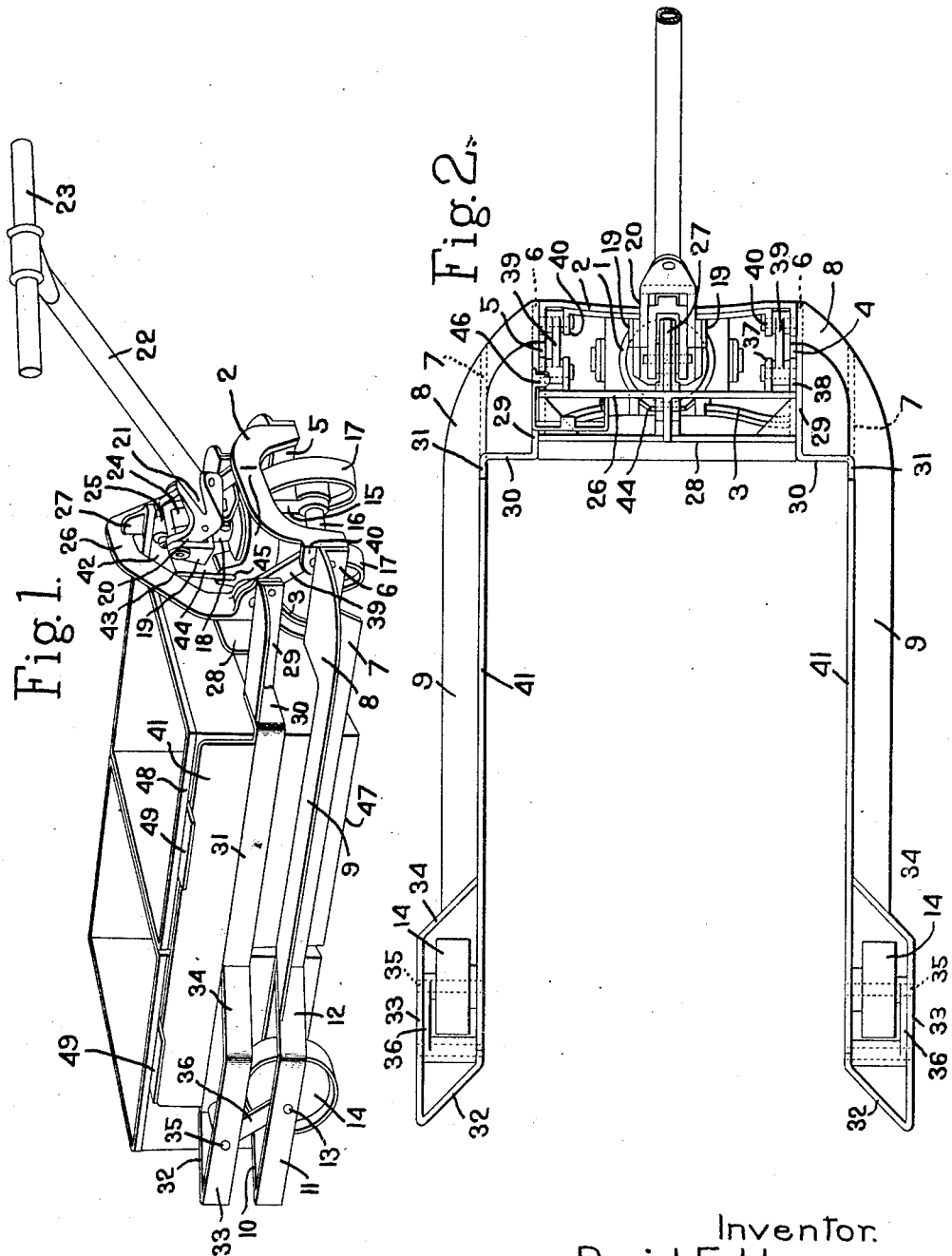
Inventor.
Daniel E. Hennessy
by Heard Smith & Tennant
Attys.

Patented Mar. 3, 1931

1,795,026

UNITED STATES PATENT OFFICE

DANIEL E. HENNESSY, OF WATERTOWN, MASSACHUSETTS, ASSIGNOR TO LEWIS-SHEPARD COMPANY, OF WATERTOWN, MASSACHUSETTS, A CORPORATION OF MASSACHUSETTS

ELEVATING TRUCK HAVING AN OPEN END

Application filed June 12, 1929. Serial No. 370,409.

This invention relates to improvements in elevating trucks and the principal object is to provide an elevating truck presenting an open end to permit the sides of the load supporting means to be introduced readily beneath the article which is to be raised and transported.

More particularly the invention relates to an elevating truck for use with load carriers having a base adapted to rest upon the floor, with sides extending upwardly therefrom provided with laterally extending lifting members located at a distance from the base of the carriers.

The truck embodying the invention comprises load supporting means presenting an open rear end and having side members spaced apart a sufficient distance to receive the carriers therebetween, with the side members underlying the lifting members of the carrier, and with the provision of means for raising the load supporting means and thereby lifting and supporting the carriers to permit the transportation thereof.

A further object of the invention is to provide an elevating truck of the character described having an open rear end and comprising steering mechanism provided with a tongue mounted to swing vertically and having means operable by a vertical swinging movement of the tongue to raise the load supporting means, by the application of a lifting force vertically to the load supporting means.

A further object of the invention is to provide an elevating truck having an open rear end and steering mechanism including a tongue mounted to swing vertically, with means for raising the load supporting means by a vertical swinging movement of the tongue when the tongue is in any steering position.

A further object of the invention is to provide an elevating truck of the character described of a novel, rigid, and durable construction.

These and other objects and features of the invention will more fully appear from the following description and the accompanying drawings and will be particularly pointed out in the claims.

In the drawings:

Fig. 1 is a perspective view of an elevating truck embodying a preferred form of the invention;

Fig. 2 is a plan view of the same, a portion of the steering tongue being broken away.

The invention comprises broadly an elevating truck having a load supporting means provided with an open end and mounted upon wheels including steering mechanism, with means for raising the load supporting means relatively to the base upon which the truck rests.

More specifically the invention comprises a wheel-supported frame having steering mechanism and presenting an open rear end, load supporting means mounted upon and movable upwardly relatively to the frame, and means preferably operable by a vertical swinging movement of the tongue when in any steering position to apply a lifting force vertically to said load supporting means.

In the particular construction illustrated in the drawings the truck comprises a frame having a head comprising a central body 1 and forward and rear arches 2 and 3 preferably integral therewith and which are connected at their ends by suitable, preferably integral, webs 4 and 5. Side bars are rigidly connected to and extend rearwardly from the yoke-shaped members of the head. These side bars preferably are of re-enforced construction.

As illustrated herein the side bars comprise vertical and horizontal members which are connected at their front ends to the yoke of the head and extend rearwardly therefrom in substantial parallelism and are unconnected at their rear ends, thereby providing an open end.

The side bars as illustrated comprise vertical plates or bars 6 and 7 and horizontal re-enforcing plates 8 which rest upon and are welded to the upper edges of the plates 6 and 7, or the vertical plate 6 may be formed integral with the broader forward ends of the plates 8. The plates 6 are secured by rivets or by welding to the respective ends 4 and 5 of the yoke portion of the head. The vertical plates or bars 7 of the side bars extend rearwardly in parallelism and lie beneath and are welded along the inner edges of the narrower rearward portions 9 of the horizontal plates 8. The vertical plates 7 are bent outwardly at their rear ends to form closed loops which, as illustrated herein, comprise outwardly bent sections 10, sections 11 extending in parallelism to the main body of the plates 7 and inwardly bent sections 12 which are welded at their ends to the outer faces of the plates 7. Shafts 13, extending across looped portions from the sections 11 of the loops to the main portion 7 of the vertical plates, provide journals for the wheels 14 which support the rear ends of the side bars. The rear pair of parallel links also desirably are journalled upon the shafts 13 as will hereinafter be more fully described.

Any suitable form of steering mechanism may be employed. In the preferred construction illustrated the steering mechanism comprises a steering post which is rotatably mounted in the body of the head and is provided with a downwardly extending yoke 15 upon which the axles 16 of the front of the steering wheels 17 are mounted. A split collar 18 embraces the upper end of the steering post and is provided with upwardly and preferably forwardly extending arms 19 upon which the base 20 of the tongue is pivoted.

The base of the tongue comprises a casting or forging having a socket 21 to receive the cylindrical tongue member 22 which is provided at its opposite end with a suitable transverse handle 23. The tongue is provided with an extension 24 having at its end a roller 25 and the tongue is so pivoted that the arc of movement of the roller, during the vertical swinging movement of the tongue, will move substantially in alinement with the vertical axis of the steering post.

The load supporting means is of skeleton form preferably conforming substantially to the form of the frame with the side members thereof preferably overlying the rearwardly extending portions of the side bars of the frame and in substantially the same planes therewith.

As illustrated the load supporting means comprises a front standard 26, preferably in the form of an arch having a forward extension 27 which overlies the axis of the steering post. The ends of the standard are connected to a vertical dash or girder 28 and the front ends of the side members 29 are rigidly secured to the standard and girder. The side members desirably are in the form of vertical plates which are provided with an offset portion 30 at the rear of the standard so that the rearwardly extending portions 31 of the side members are located above and in substantial alinement with the vertical members 7 of the side bars. The rearwardly extending side members of the load supporting means are bent outwardly into loops corresponding to those of the side bars of the frame and comprise outwardly extending sections 32, sections 33 extending parallel to the side members, and sections 34 bent inwardly and welded at their ends to the side members 31.

Shafts 35, which are mounted in the section 33 of the loop and the plate 31, provide pivotal connections for the upper ends of a rear pair of parallel links 36 which are pivotally mounted at their lower ends upon the shafts 13 upon which the wheels 14 are mounted, as above described. The standard 26 is provided with forwardly extending bosses 37 and 38 in which the upper ends of forward parallel links 39 are pivoted, the lower ends of the links being mounted upon corresponding members 40 at the ends of the yoke 2 of the main frame.

By reason of this construction the load supporting means may be lifted vertically and at the same time moved longitudinally with respect to the main frame. If desired, the effective height of the side members 31 of the load supporting means may be supplemented by welding, or otherwise, securing thereto plates 41 extending upwardly in the vertical plane of the bars, or other means may be secured to the side members of the load supporting means properly to engage the device or devices which is or are to be lifted.

In the operation of the device the roller 25 upon the tongue extension underlies and engages the flat under surface of the extension 27 of the platform standard 26. A downward vertical swinging movement of the tongue causes the roller to move upwardly in substantial alinement with the vertical axis of the steering post and applies a lifting force vertically to the standard of the platform. As the platform is raised thereby it is moved forward by the front and rear pairs of parallel links 39 and 36. During such lifting movement the front links 39 are maintained under tension instead of compression, as in usual parallel link constructions, thereby avoiding to a considerable extent wear upon the pivotal connections of the front links, which in usual constructions wear more rapidly than the bearings for the rear links, because the pulling force of the lifting mechanism in such constructions is applied more forcefully to the front pair of parallel links.

By reason of the fact that the upward movement of the roller 25 on the tongue extension is in substantial alinement with the vertical axis of the steering post, the load supporting means may be raised in the manner above described with the steering tongue in any steering position, thereby enabling the load to be lifted or deposited with the tongue at the side in a narrow alley which would not permit the tongue to be brought into substantial alinement with the longitudinal axis of the truck.

Any suitable means may be provided for locking the load supporting means in elevated position. In the preferred construction illustrated the standard is provided with a web 42 which presents at its lower edge a shoulder 43 adapted to be engaged by a locking dog 44 which is pivotally mounted at its lower end in a socket 45 on the head of the truck and is provided with a foot lever 46 which, when depressed, will swing the locking dog 44 forwardly out of engagement with said shoulder.

The steering mechanism and locking mechanism herein described may be and desirably is similar to that disclosed in my prior Patent No. 1,741,712, granted December 31, 1929.

The open ended truck embodying the present invention is particularly adapted for the transportation of carriers having a base 47 adapted to rest upon the ground or floor, with sides 48 extending upwardly therefrom and provided at a distance from the base with outwardly extending lifting members 49, such as brackets or flanges which are adapted to overlie the vertical side members 31 of the load supporting means. Carriers of this construction are very desirable containers for small articles, such as bolts, nuts, and small machine parts, and can be readily transported by a truck of this character without the necessity of the supporting platform which is required for usual types of elevating trucks. The open ended trucks can be so constructed as to transport a plurality of such receptacles as is illustrated in Fig. 1 of the drawings.

Open ended trucks of this character may also be employed in the same manner as usual elevating trucks to transport platforms upon which articles are assembled, and also may be used to transport machinery where the legs thereof are so disposed as to permit the open end of the truck to be introduced therebeneath. The truck, therefore, having an open end can be employed for various uses for which usual types of elevating trucks are not adapted.

It may be mentioned that when the tongue is raised to a vertical position, the extension thereof will engage the head of the frame so that the truck may be pushed rearwardly as well as pulled forwardly, in which case the open end of the truck might be considered the forward end.

It will, therefore, be understood that the term "open rear end" as described herein is not intended to limit the invention to a construction in which the steering and/or lifting mechanism is necessarily at the usual front end of the truck.

It will also be understood that the embodiment of the invention particularly described herein is of an illustrative character and is not restrictive, and that various changes in form, construction and arrangement of parts may be made within the meaning and scope of the following claims.

Having thus described the invention, what is claimed as new and desired to be secured by Letters Patent, is:

1. An elevating truck for load carriers having a base and lifting means extending laterally from opposite sides of said carriers at a distance from the base area thereof, comprising a load supporting means having side members separated at one end sufficient to admit the carriers therebetween with the lifting means thereof overlying said side members, steering mechanism having a tongue mounted to swing vertically, and means operable by a vertical swinging movement of said tongue, when in any steering position, to raise said load supporting means and thereby lift and support said carriers.

2. An elevating truck comprising a head, steering mechanism mounted in said head having a tongue mounted to swing vertically, load supporting means having an open rear end, and means operable by a vertical swinging movement of said tongue, when in any steering position, to raise said load supporting means.

3. An elevating truck comprising a frame having a head, side bars rigidly secured thereto and extending rearwardly therefrom in separated relation to provide an open rear end, wheels supporting the rear ends of said side bars, steering mechanism mounted in said head having a tongue pivotally mounted to swing vertically, load supporting means mounted on said frame provided with an open rear end, and means operable by a vertical swinging movement of the tongue, when in any steering position, to raise said load supporting means.

4. An elevating truck comprising a frame having a head, side bars rigidly secured thereto and extending rearwardly therefrom in separated relation to provide an open rear end, wheels supporting the rear ends of said side bars, steering mechanism mounted in said head having a tongue pivotally mounted to swing vertically, load supporting means comprising side members overlying the respective side bars of said frame, and means operable by a vertical swinging movement of said tongue to raise said load supporting means relatively to said frame with the tongue in any steering position.

5. An elevating truck comprising a frame having a head, side bars rigidly secured thereto and extending rearwardly therefrom in separated relation to provide an open rear end, wheels supporting the rear ends of said side bars, steering mechanism mounted in said head having a tongue pivotally mounted to swing vertically, load supporting means connected to said frame by parallel links and presenting an open rear end, and means operable by a vertical swinging movement of said tongue to apply a lifting force vertically to said load supporting means.

6. An elevating truck comprising a frame having a head, side bars rigidly secured thereto and extending rearwardly therefrom in separated relation to provide an open rear end, wheels supporting the rear ends of said side bars, steering mechanism mounted in said head having a tongue pivotally mounted to swing vertically, load supporting means connected to said frame by parallel links and having an open end and a front standard having an extension overlying said steering mechanism, and means operable by a vertical swinging movement of said tongue to apply a lifting force vertically to said standard extension to raise said load supporting means.

7. An elevating truck comprising a frame having a head, side bars rigidly secured thereto and extending rearwardly therefrom in separated relation to provide an open rear end, wheels supporting the rear ends of said side bars, steering mechanism mounted in said head having a tongue pivotally mounted to swing vertically, load supporting means connected to said frame by parallel links and presenting an open rear end and having a front standard provided with an extension overlying said steering mechanism, a tongue extension having anti-friction means movable substantially in the direction of the vertical axis of the steering mechanism operable upon depression of said tongue to engage the flat under surface of said standard extension and thereby raise the load supporting means.

8. An elevating truck comprising a frame having a head and laterally re-enforced side bars rigidly connected thereto and extending rearwardly therefrom and spaced apart to provide an open rear end and reversely bent outwardly at their rear ends to form loops, wheels supporting the rear end portion of said side bars, mounted within said loops, steering mechanism mounted in said head, and load supporting means having an open rear end mounted on said frame, and means for raising said load supporting means relatively to said frame.

9. An elevating truck comprising a frame having a head and side bars rigidly connected thereto and extending rearwardly therefrom and spaced apart to provide an open rear end, and reversely bent outwardly at their rear ends to form closed loops, wheels journalled in the respective loops, steering mechanism mounted in said head having a tongue mounted to swing vertically, and load supporting means mounted on said frame presenting an open rear end, and means operable by a vertical swinging movement of said tongue to raise said load supporting means.

10. An elevating truck comprising a frame having a head and side bars rigidly connected thereto and extending rearwardly therefrom and spaced apart to provide an open rear end, and reversely bent outwardly at their rear ends to form closed loops, wheels journalled in the respective loops, steering mechanism mounted in said head having a tongue mounted to swing vertically, and load supporting means comprising a front standard, and side members rigidly connected thereto and extending rearwardly therefrom overlying said side bars and reversely bent outwardly at their rear ends to form closed loops, links pivotally mounted at their lower ends upon the axles of said rear wheels within the closed loops of the side bars and pivotally mounted at their upper ends within the closed loops of the side members of the load supporting means, links substantially parallel to the rear links connecting the front ends of the frame and load supporting means, and means operable by a vertical swinging movement of said tongue to raise said load supporting means relatively to the frame.

In testimony whereof, I have signed my name to this specification.

DANIEL E. HENNESSY.